(12) United States Patent
Huang et al.

(10) Patent No.: US 8,351,602 B2
(45) Date of Patent: Jan. 8, 2013

(54) DUAL-MODE WIRELESS SENSOR NETWORK SYSTEM AND KEY ESTABLISHING METHOD AND EVENT PROCESSING METHOD THEREOF

(75) Inventors: Yi-Hsiung Huang, Tainan County (TW); Lun-Chia Kuo, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 1145 days.

(21) Appl. No.: 12/037,949

(22) Filed: Feb. 27, 2008

(65) Prior Publication Data
US 2009/0141899 A1   Jun. 4, 2009

(30) Foreign Application Priority Data
Dec. 3, 2007   (TW) ................................ 96145908 A

(51) Int. Cl.
*H04K 1/10* (2006.01)
*H04K 1/00* (2006.01)

(52) U.S. Cl. .......... 380/33; 380/270; 380/255; 713/150; 713/168; 713/171; 709/224; 709/239

(58) Field of Classification Search .............. 380/28–30, 380/47, 255–283; 709/224, 239; 713/150–154, 713/160–167, 189–193
See application file for complete search history.

(56) References Cited

U.S. PATENT DOCUMENTS

| 7,076,656 | B2 | 7/2006 | MacKenzie |
| 7,243,232 | B2 | 7/2007 | Vanstone et al. |
| 7,486,795 | B2 * | 2/2009 | Eschenauer et al. .......... 380/277 |
| 8,000,468 | B2 * | 8/2011 | Huang .............................. 380/28 |
| 8,014,523 | B2 * | 9/2011 | Naslund ........................... 380/44 |
| 8,027,474 | B2 * | 9/2011 | Huang et al. ................... 380/270 |
| 2004/0249563 | A1 * | 12/2004 | Otsuki et al. .................. 701/200 |
| 2005/0125542 | A1 * | 6/2005 | Zhu ................................ 709/227 |
| 2005/0207376 | A1 * | 9/2005 | Ashwood-Smith et al. .. 370/338 |
| 2006/0031934 | A1 | 2/2006 | Kriegel |

(Continued)

FOREIGN PATENT DOCUMENTS
TW          200718145         5/2007

OTHER PUBLICATIONS

"Office Action of Taiwan Counterpart Application", issued on Oct. 12, 2011, p. 1-4, in which the listed references were cited.

*Primary Examiner* — Linglan Edwards
(74) *Attorney, Agent, or Firm* — Jianq Chyun IP Office

(57) ABSTRACT

A dual-mode wireless sensor network system including a local wireless sensor, a local event processing device, and a remote event processing device is provided. The local wireless sensor detects and announces an abnormal event. The local event processing device and the remote event processing device receive the abnormal event announcement. When the local wireless sensor detects the abnormal event, the local wireless sensor encrypts an abnormal event message related to the abnormal event with a regular mode key and transmits the encrypted abnormal event message to the local event processing device. When the local wireless sensor does not receive a response message from the local event processing device, the local wireless sensor encrypts the abnormal event message with a special mode key and transmits the encrypted abnormal event message to the remote event processing device. Thereby, the abnormal event can be successfully announced even with highly protected privacy.

14 Claims, 16 Drawing Sheets

U.S. PATENT DOCUMENTS

| | | | |
|---|---|---|---|
| 2006/0178156 A1* | 8/2006 | Kim | 455/466 |
| 2006/0224421 A1* | 10/2006 | St. Ores et al. | 705/4 |
| 2007/0005292 A1* | 1/2007 | Jin | 702/150 |
| 2007/0053520 A1* | 3/2007 | Eckleder | 380/278 |
| 2007/0078817 A1 | 4/2007 | Girao et al. | |
| 2007/0110225 A1 | 5/2007 | Leventhal et al. | |
| 2007/0171050 A1 | 7/2007 | Westhoff et al. | |
| 2008/0153432 A1* | 6/2008 | Zhu et al. | 455/90.2 |
| 2010/0049799 A1* | 2/2010 | Nesse et al. | 709/204 |

* cited by examiner (a)

Key table of sensor — 302

| Mode | Event processor ID | Key | Generation time |
|---|---|---|---|
| 0 | 110 | K1 | T1 |
| | | | |
| | | | |
| | | | |

(b)

Key table of event processing device — 304

| Mode | Sensor ID | Key | Generation time |
|---|---|---|---|
| --- | --- | --- | --- |
| 0 | 112 | K1 | T1 |
| | | | |
| | | | |

Key table of sensor — 302

| Mode | Event processor ID | Key | Generation time |
|---|---|---|---|
| 0 | 110 | K1 | T1 |
| 1 | 120a | K2 | T2 |
| 1 | 120b | K3 | T3 |
| 1 | 120c | K4 | T4 |
| 2 | 130 | K5 | T5 |

(b)

Key table of event processing device — 308

| Mode | Sensor ID | Key | Generation time |
|---|---|---|---|
| --- | --- | --- | --- |
| 2 | 112 | K5 | T5 |
| | | | |
| | | | |
| | | | |

FIG. 14

DUAL-MODE WIRELESS SENSOR NETWORK SYSTEM AND KEY ESTABLISHING METHOD AND EVENT PROCESSING METHOD THEREOF

CROSS-REFERENCE TO RELATED APPLICATION

This application claims the priority benefit of Taiwan application serial no. 96145908, filed on Dec. 3, 2007. The entirety of the above-mentioned patent application is hereby incorporated by reference herein and made a part of this specification.

BACKGROUND OF THE INVENTION

1. Field of the Invention

The present invention generally relates to a wireless sensor network, in particular, to a dual-mode wireless sensor network system, a key establishing method thereof, and an event processing method thereof.

2. Description of Related Art

In recent years, sensor networks have been broadly applied to the state monitoring of large-area objects, such as homeland security monitoring, environmental pollutant monitoring, and security monitoring at large construction sites (for example, the construction site of rapid transit system). In order to ensure the security of a monitored object, sensors continuously send detected states of the monitored object back to a system monitoring center (or an event processing device).

Conventionally, sensor networks can be categorized into wired sensor networks and wireless sensor networks according to the data transmission methods thereof. In a wired sensor network, sensor modules are connected to a monitoring center through physical connections (for example, network cables or optical fibers). The layout cost of a wired sensor network is very high, and it is very inconvenient to change the locations of sensors in the network. Thus, wireless sensor networks have been developed in recent years, wherein the sensor modules transmit data through wireless connections, and messages are relayed to the monitoring center through multiple wireless sensors.

Wireless sensors require no physical connection and accordingly are easy to be deployed, and a user can purchase wireless sensors and set up a home-based wireless sensor network easily. Thereby, it can be expected that in the near future, each family will have its own wireless sensor network. With the widespread of wireless sensor networks, wireless sensor networks of adjacent families are likely to overlap each other. How to appropriately separate the overlapped wireless sensor networks and effectively issue an abnormal event announcement when an abnormal event takes place while at the same time, protect the privacy of each family and prevent malice attack are the key points in the promotion of wireless sensor networks. Accordingly, a wireless sensor network system which offers both high privacy protection and effective abnormal event announcement is to be developed.

SUMMARY OF THE INVENTION

Accordingly, the present invention is related to a dual-mode wireless sensor network system, wherein abnormal event announcements can be effectively transmitted even with highly protected privacy.

The present invention is related to a key establishing method for a dual-mode wireless sensor network system, wherein when wireless sensors are deployed and when the environment around the wireless sensors is changed, keys are quickly established and updated so that abnormal event announcements can be effectively transmitted even with highly protected privacy.

The present invention is related to an event processing method for a dual-mode wireless sensor network system, wherein abnormal event announcements can be effectively transmitted even with highly protected privacy.

The present invention provides a dual-mode wireless sensor network system including at least one local wireless sensor, a local event processing device, and at least one remote event processing device. The local wireless sensor detects an abnormal state of an environmental event and transmits an abnormal event message. The local event processing device receives the abnormal event message from the local wireless sensor, wherein the local wireless sensor cooperates with the local event processing device to establish a regular mode key. The remote event processing device receives the abnormal event message from the local wireless sensor, wherein the local wireless sensor cooperates with the remote event processing device to establish a special mode key. When the local wireless sensor detects the abnormal state, the local wireless sensor encrypts the abnormal event message related to the abnormal state with the regular mode key and transmits the encrypted abnormal event message to the local event processing device. When the local wireless sensor does not receive a response message from the local event processing device, the local wireless sensor encrypts the abnormal event message related to the abnormal state with the special mode key and transmits the encrypted abnormal event message to the remote event processing device.

The present invention provides a key establishing method for a dual-mode wireless sensor network system, wherein the dual-mode wireless sensor network system includes at least one local wireless sensor, a local event processing device, and at least one remote event processing device. The key establishing method for the dual-mode wireless sensor network system includes: cooperatively establishing a regular mode key between the local wireless sensor and the local event processing device; and cooperatively establishing a special mode key between the local wireless sensor and the remote event processing device through the local event processing device.

The present invention provides an event processing method for a dual-mode wireless sensor network system, wherein the dual-mode wireless sensor network system includes at least one local wireless sensor, a local event processing device, and at least one remote event processing device. The event processing method for the dual-mode wireless sensor network system includes: when the local wireless sensor detects an abnormal state of an environmental event, encrypting an abnormal event message related to the abnormal state with a regular mode key and transmitting the encrypted abnormal event message to the local event processing device; and when the local wireless sensor does not receive a response message from the local event processing device, encrypting the abnormal event message related to the abnormal state with a special mode key and transmitting the encrypted abnormal event message to the remote event processing device.

In the present invention, a dual-mode wireless sensor network system is provided such that abnormal event announcements can be effectively transmitted even with highly protected privacy.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 illustrates the key tables of a local wireless sensor and a local event processing device when the regular mode key is established according to the first embodiment of the present invention.

FIG. 14 illustrates the key tables of a local wireless sensor and a central event processing device when the centralized mode key is established according to the third embodiment of the present invention.

DESCRIPTION OF THE EMBODIMENTS

Figure 1:
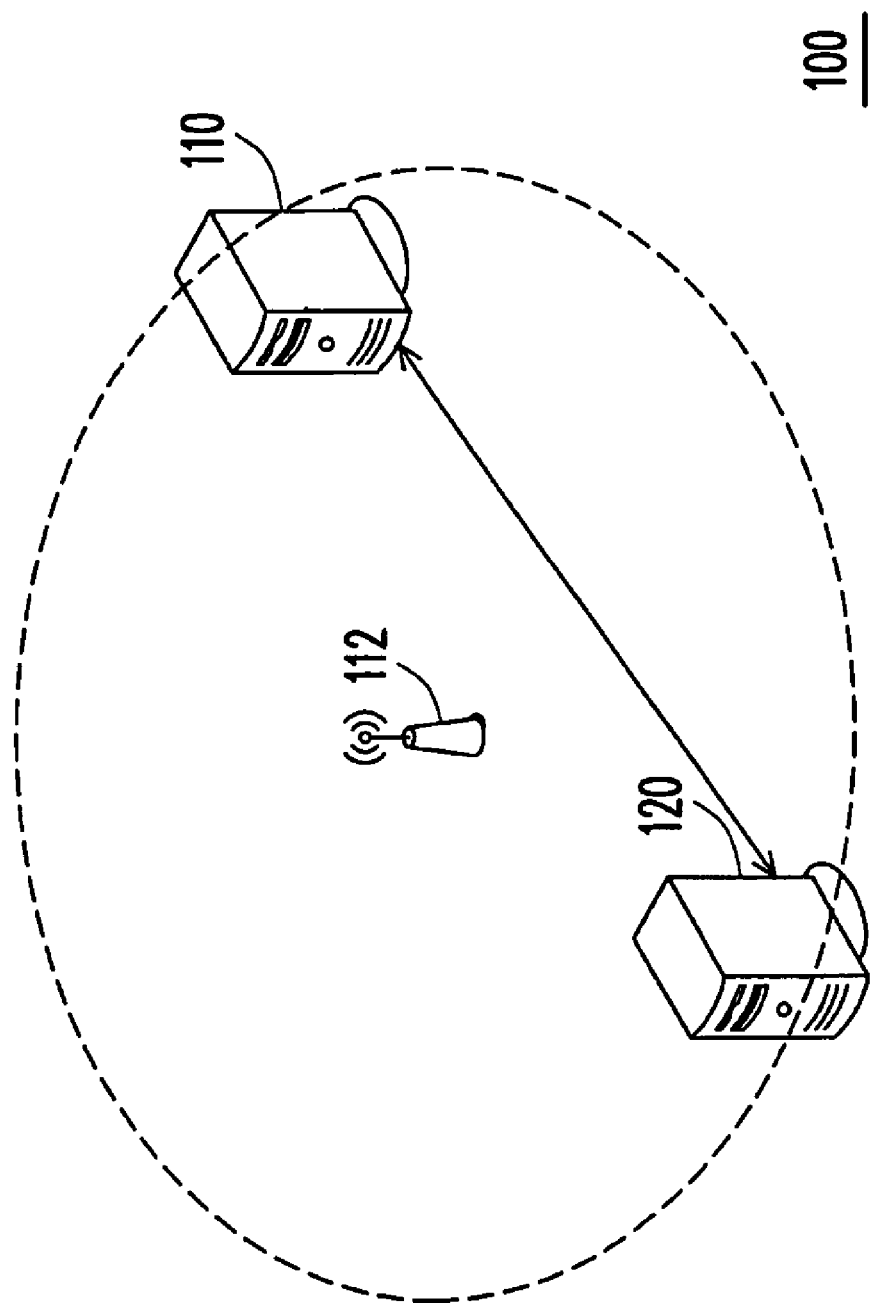
FIG. 1 is a block diagram of a dual-mode wireless sensor network system according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

According to an exemplary embodiment of the present invention, in order to ensure the independency and communication security of each wireless sensor network and at the same time, the present invention provides announcements in different channels when an emergency takes place. A dual-mode wireless sensor network system with a dual-mode key establishing mechanism is provided by the present invention, wherein the dual modes include a regular mode for normal communication and an emergent mode for communicating with external devices when a host (i.e. a local event processing device) is abnormal. The dual-mode wireless sensor network system includes at least one local wireless sensor, a local event processing device, and at least one remote event processing device. When the local wireless sensor detects an abnormal state, it encrypts an abnormal event message related to the abnormal state with a regular mode key and transmits the encrypted abnormal event message to the local event processing device. After that, when the local wireless sensor does not receive a response message from the local event processing device, it encrypts the abnormal event message with a special mode key and transmits the encrypted abnormal event message to the remote event processing device. Thereby, the abnormal event message can be successfully transmitted even with highly protected privacy. Exemplary embodiments of the present invention will be described below with reference to accompanying drawings.

First Embodiment

FIG. 1 is a block diagram of a dual-mode wireless sensor network system according to the first embodiment of the present invention.

Referring to FIG. 1, the dual-mode wireless sensor network system 100 is deployed in a community for monitoring fire events. However, the present invention is not limited thereto, and the dual-mode wireless sensor network system provided by the present invention may also be applied in other fields for monitoring other environmental events, such as temperature, humidity, pressure, light, and heat. The dual-mode wireless sensor network system 100 includes a local event processing device 110, a local wireless sensor 112, and a neighbor event processing device 120, wherein the neighbor event processing device 120 is a kind of remote event processing device as described above.

The local wireless sensor 112 is a sensor used for monitoring an environmental event, and when the local wireless sensor 112 detects an abnormal state of the environmental event, it transmits an abnormal event message containing the abnormal state. To be specific, the local wireless sensor 112 monitors the temperature around where it is deployed, and when the local wireless sensor 112 detects that the temperature is over a threshold, it generates an abnormal event message and transmits the abnormal event message in a wireless mode. However, the present invention is not limited to a wireless sensor for monitoring temperature. In another exemplary embodiment of the present invention, the local wireless sensor may also be a sensor for monitoring another environmental event, such as humidity, gas, or pressure. In the exemplary embodiment of present invention, only one local wireless sensor 112 is demonstratively described. However, the dual-mode wireless sensor network system 100 may also include multiple local wireless sensors 112.

The local event processing device 110 receives the abnormal event message from the local wireless sensor 112 and carries out subsequent process (for example, issuing an abnormality alarm to a monitor) according to the abnormal event message. In the present embodiment, the local wireless sensor 112 is deployed within a certain range which allows the local wireless sensor 112 to communicate directly with the local event processing device 110. However, when there is more than one local wireless sensor, a specific local wireless sensor may also indirectly communicate with the local event processing device through the other local wireless sensors. How a wireless sensor relays a received message should be understood by those skilled in the art therefore will not be described herein.

In order to ensure the communication security of the wireless sensor network formed by the local event processing device 110 and the local wireless sensor 112 thereof and to prevent any interception and attack from some malice nodes, the local wireless sensor 112 and the local event processing device 110 cooperate to establish a regular mode key, wherein the local wireless sensor 112 is connected to the local event processing device 110 through a connection port of the local wireless sensor 112 in order to cooperatively establish the regular mode key, and the establishing of the regular mode key is initiated by a user so as to prevent possible attacks (for example, stealing). It should be mentioned that the connection port in the present invention may be any COM port (for example, a USB port) for connecting the local wireless sensor 112 and the local event processing device 110. In another exemplary embodiment of the present invention, the local wireless sensor 112 may be connected to the local event processing device 110 through other suitable connection ports. After the regular mode key is established, data transmitted between the local wireless sensor 112 and the local event processing device 110 is encrypted/decrypted with the regular mode key. In the present embodiment, the mode in which the local wireless sensor 112 and the local event processing device 110 communicate with each other by using the regular mode key is referred as a regular mode.

Figure 2:
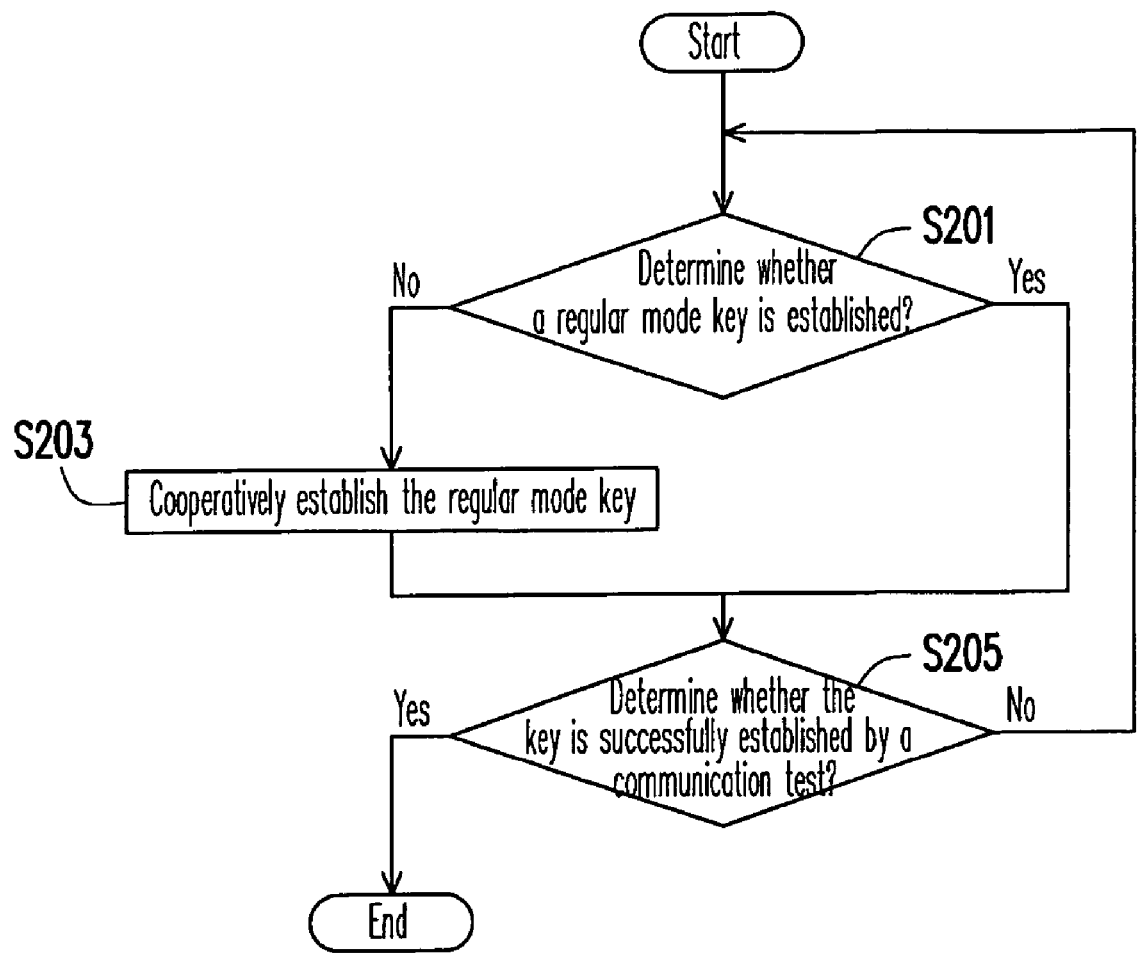
FIG. 2 is a flowchart illustrating the establishing of a regular mode key according to the first embodiment of the present invention.

FIG. 2 is a flowchart illustrating the establishing of a regular mode key according to the first embodiment of the present invention.

Referring to FIG. 2, in step S201, the local event processing device 110 determines whether the regular mode key is established. If it is determined in step S201 that the regular mode key is not yet established, the local wireless sensor 112 cooperates with the local event processing device 110 to establish the regular mode key in step S203. To be specific, in step S203, the local event processing device 110 generates a fixed-length key as the regular mode key between the local wireless sensor 112 and the local event processing device 110, and related key information is respectively recorded in the local wireless sensor 112 and the local event processing device 110.

FIG. 3 illustrates the key tables of the local wireless sensor 112 and the local event processing device 110 when the regular mode key is established according to the first embodiment of the present invention.

Referring to FIG. 3, FIG. 3(a) illustrates a key table 302 of the local wireless sensor 112, and the key table 302 includes a mode field, an event processor ID field, a key field, and a generation time field. The mode field records the mode of a key. In the present embodiment, "0" is recorded into the mode field when the cooperatively established key is the regular mode key. The event processor ID field records an event processing device (for example, the local event processing device 110) which cooperates with the local wireless sensor 112 to establish the key. The key field records the cooperatively established key (for example, a key $K_1$). The generation time field records the time when the key is generated (for example, a time $T_1$).

FIG. 3(b) illustrates a key table 304 of the local event processing device 110, and the key table 304 includes a mode field, a sensor ID field, a key field, and a generation time field. The mode field records the mode of a key. In the present embodiment, "0" is recorded into the mode field when the cooperatively established key is the regular mode key. The sensor ID field records a sensor (for example, the local wireless sensor 112) which cooperates with the local event processing device 110 to establish the key. The key field records the cooperatively established key (for example, a key $K_1$). The generation time field records the time when the key is generated (for example, a time $T_1$).

As shown in FIG. 3(a) and FIG. 3(b), related key information is respectively recorded into the key table 302 and the key table 304 when a regular mode key is established.

Referring to FIG. 2 again, if it is determined in step S201 that the regular mode key is already established, a communication test is carried out and whether the regular mode key is successfully established is determined in step S205. To be specific, in step S205, the local wireless sensor 112 transmits a testing communication packet encrypted with the established regular mode key to the local event processing device 110, and it is determined that the regular mode key is successfully established if the local event processing device 110 confirms that the decrypted message is meaningful; otherwise, it is determined that the regular mode key is not successfully established. If it is determined in step S205 that the regular mode key is successfully established, the process for establishing the regular mode key is ended. If it is determined in step S205 that the regular mode key is not successfully established, the process returns to step S201 to re-establish the regular mode key.

The neighbor event processing device 120 is deployed within a communicable range of the local wireless sensor 112, and similar to the local event processing device 110, the neighbor event processing device 120 also receives the abnormal event message from the local wireless sensor 112. In addition, the local event processing device 110 is connected to the neighbor event processing device 120 through a wired network. In another exemplary embodiment of the present invention, the local event processing device 110 may also be connected to the neighbor event processing device 120 through a wireless network.

Figure 4:
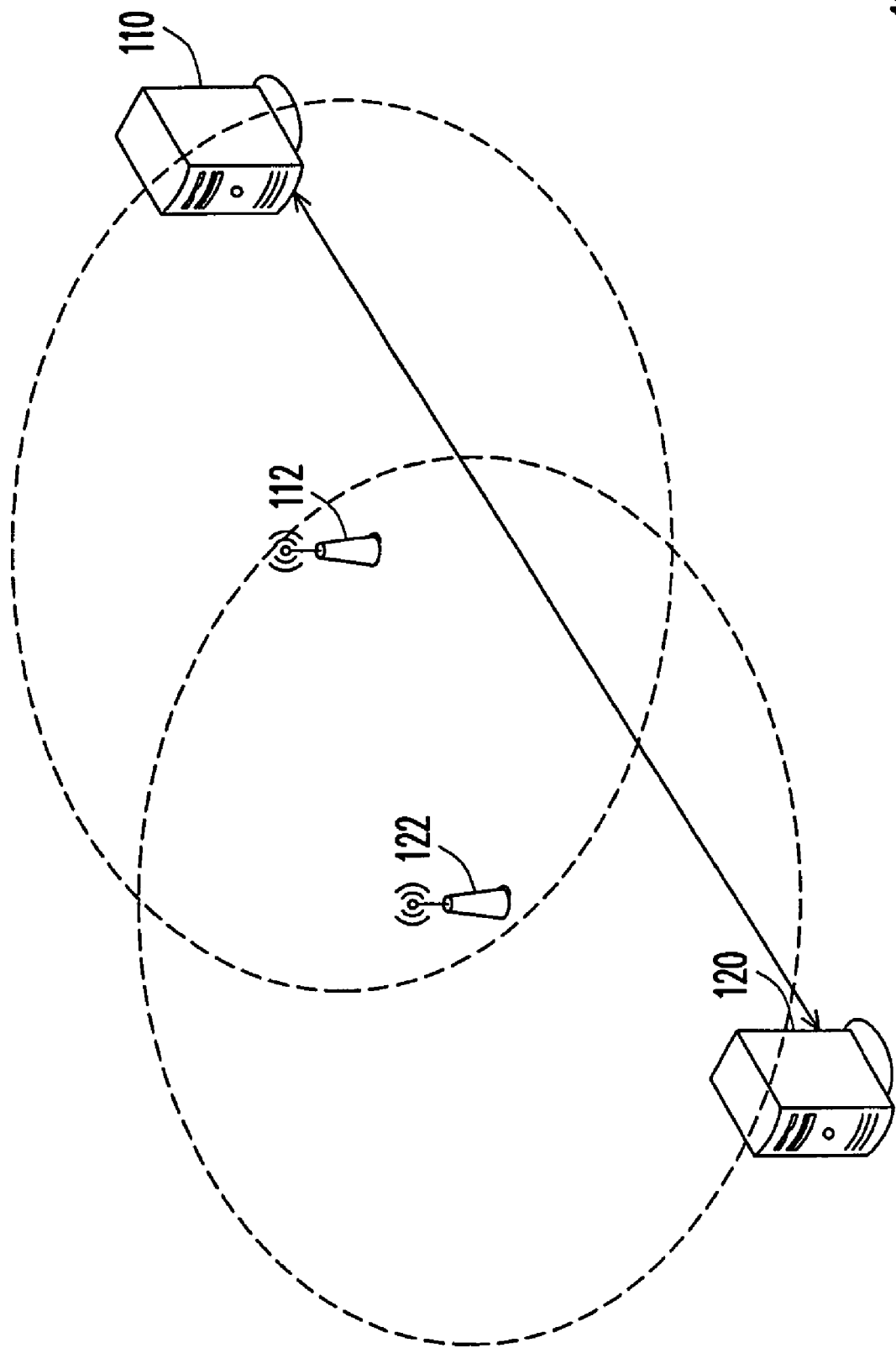
FIG. 4 is a block diagram of a dual-mode wireless sensor network system according to another embodiment of the present invention.

Similarly, in order to ensure the communication security of the wireless sensor network, the local wireless sensor 112 cooperates with the neighbor event processing device 120 to establish a cooperative mode key, wherein the cooperative mode key is a special mode key as described above. To be specific, when the local wireless sensor 112 is physically deployed, it searches for a neighbor event processing device 120 within the communicable range thereof and cooperates with the neighbor event processing device 120 to establish the cooperative mode key through the local event processing device 110. It should be mentioned that in another exemplary embodiment of the present invention, the neighbor event processing device 120 may further include one or multiple neighbor wireless sensors 122. Thus, the local wireless sensor 112 can indirectly communicate with the neighbor event processing device 120 through the neighbor wireless sensors 122 (as shown in FIG. 4).

Thereafter, data transmitted between the local wireless sensor 112 and the neighbor event processing device 120 is encrypted with the cooperative mode key. In the present embodiment, the mode in which the local wireless sensor 112 and the neighbor event processing device 120 communicate with each other by using the cooperative mode key is referred as a cooperative mode, and which is also an emergent mode as described above.

Figure 5:
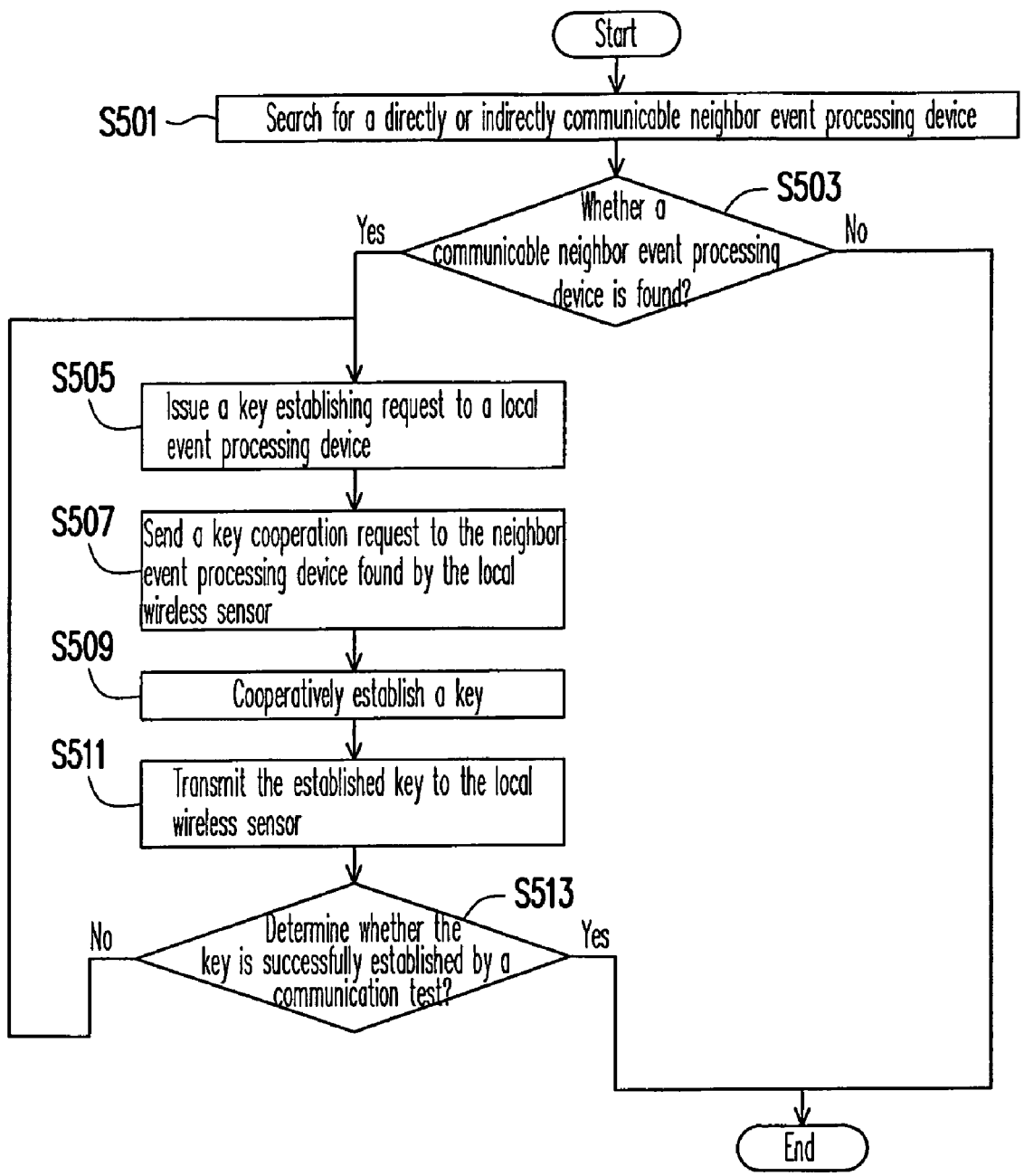
FIG. 5 is a flowchart illustrating the establishing of a special mode key according to the first embodiment of the present invention.

FIG. 5 is a flowchart illustrating the establishing of a special mode key according to the first embodiment of the present invention.

Referring to FIG. 5, in step S501, the local wireless sensor 112 searches for a neighbor event processing device 120 which the local wireless sensor 112 can communicate with directly or indirectly, wherein the indirect communication refers to that when the neighbor event processing device 120 has neighbor wireless sensors or other transmitters, the local wireless sensor 112 communicates with the neighbor event processing device 120 through the neighbor wireless sensors or other transmitters of the neighbor event processing device 120, and the direct communication refers to that the local wireless sensor 112 communicates with the neighbor event processing device 120 through no neighbor wireless sensor or other transmitter.

Whether a communicable neighbor event processing device 120 is found is determined in step S503. If it is determined in step S503 that no communicable neighbor event processing device 120 is found, the key establishing process is ended. Otherwise, in step S505, the local wireless sensor 112 issues a key establishing request to the local event processing device 110. In step S507, the local event processing device 110 issues a key establishing cooperation request to the neighbor event processing device 120 found by the local wireless sensor 112. In step S509, the local event processing device 110 cooperates with the neighbor event processing device 120 to establish a cooperative mode key. After that, in step S511, the local event processing device 110 transmits the cooperatively established cooperative mode key to the local wireless sensor 112. To be specific, in steps S509 and S511, a key is cooperatively established and related key information is respectively recorded in the local wireless sensor 112 and the neighbor event processing device 120.

Figure 6:
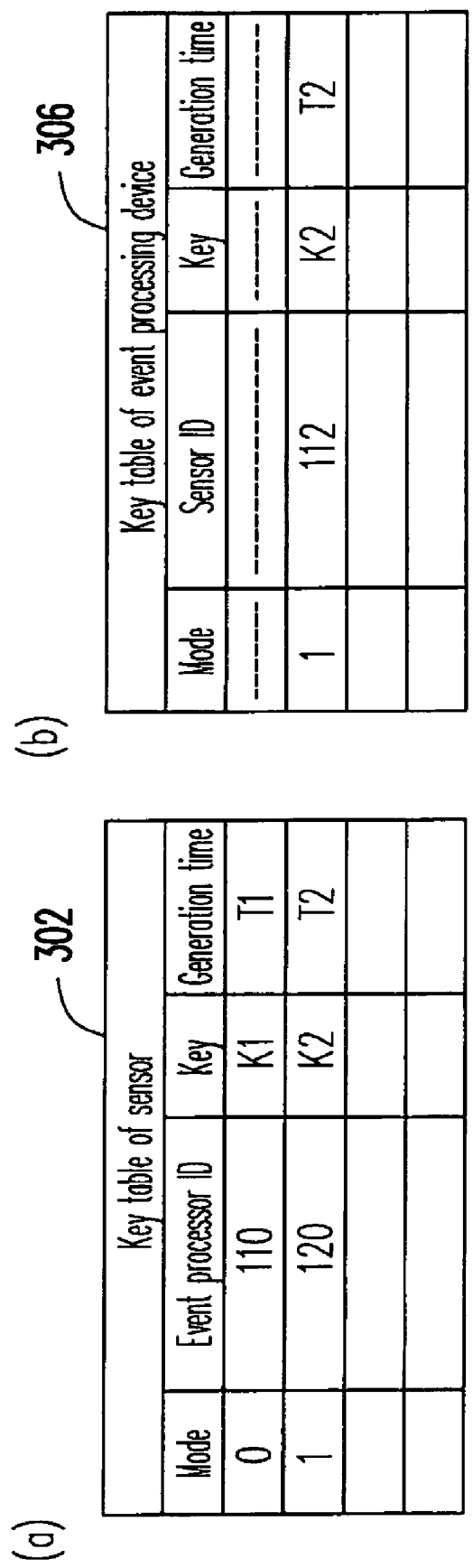
FIG. 6 illustrates the key tables of the local wireless sensor and a remote event processing device when the special mode key is established according to the first embodiment of the present invention.

FIG. 6 illustrates the key tables of the local wireless sensor 112 and the neighbor event processing device 120 when the cooperative mode key is established according to the first embodiment of the present invention.

Referring to FIG. 6, FIG. 6(a) illustrates a key table 302 of the local wireless sensor 112, and the cooperative mode key is inserted after the regular mode key, wherein "1" is recorded in the mode field for indicating that this is a cooperative mode key, and the recording of other fields is similar to that shown in FIG. 3(a) therefore will not be described herein.

FIG. 6(b) illustrates a key table 306 of the neighbor event processing device 120, and the key table 306 also includes a mode field, a sensor ID field, a key field, and a generation time field. The recording of the key table 306 is the same as that of the key table of the local event processing device 110 therefore will not be described herein.

As shown in FIGS. 6(a) and 6(b), when a cooperative mode key is established, the related key information is respectively recorded into the key table 302 and the key table 306.

Referring to FIG. 5 again, in step S513, a communication test is carried out and whether the key is successfully established is determined. To be specific, in step S513, the local wireless sensor 112 transmits a testing communication packet encrypted with the established key to the neighbor event processing device 120, and it is determined that the key is successfully established if the neighbor event processing device 120 confirms that the decrypted message is meaningful; otherwise, it is determined that the key is not successfully established. If it is determined in step S513 that the key is successfully established, the process for establishing the cooperative mode key is ended. If it is determined in step S513 that the key is not successfully established, the process returns to step S505.

In the present embodiment, the cooperative mode key is established by using an ISO/IEC 11770-3 key agreement protocol. However, the present invention is not limited thereto, and in another exemplary embodiment of the present invention, the cooperative mode key may also be established by using another suitable key agreement protocol.

As described above, the wireless sensor network system in the present embodiment has dual-mode keys. Thereby, a dual-mode key establishing process is executed when the wireless sensor network system in the present embodiment is set up.

Figure 7:
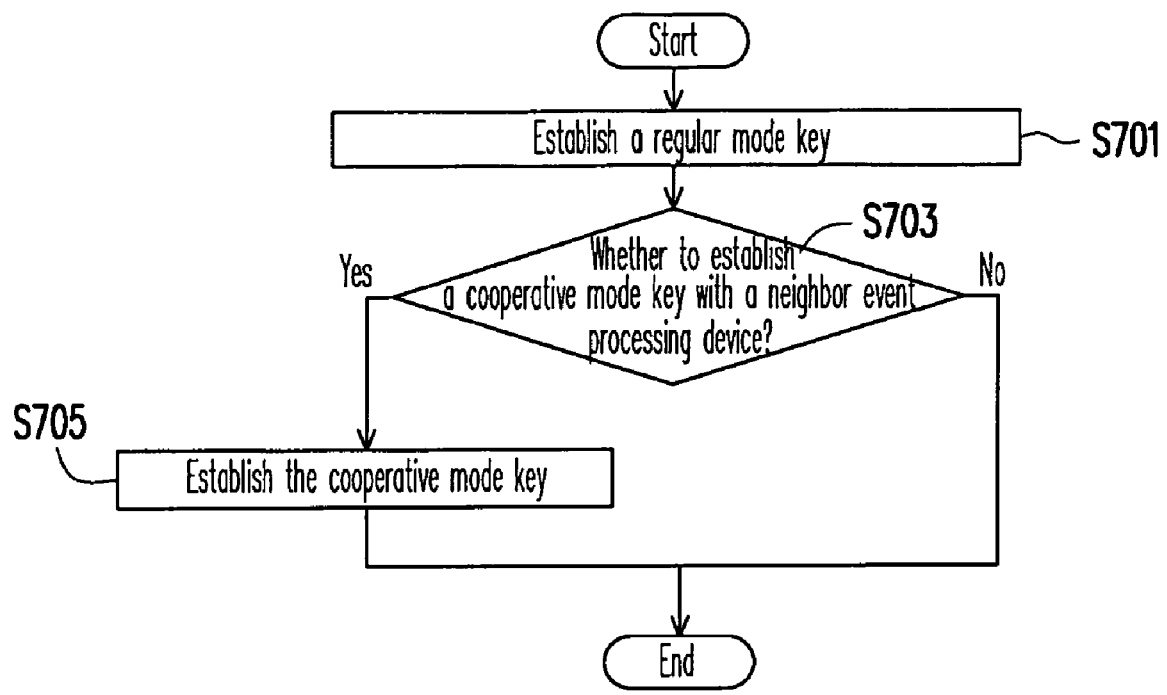
FIG. 7 is a flowchart of a key establishing method for a dual-mode wireless sensor network system according to the first embodiment of the present invention.

FIG. 7 is a flowchart of a key establishing method for a dual-mode wireless sensor network system according to the first embodiment of the present invention.

Referring to FIG. 7, in step S701, a regular mode key is established through a process as shown in FIG. 2. After that, in step S703, whether a cooperative mode key is to be established with a neighbor event processing device is determined. If it is determined in step S703 that the cooperative mode key is to be established, the cooperative mode key is established in step S705 through a process as shown in FIG. 5.

It should be mentioned that in the present invention, the local wireless sensor 112 is physically deployed after the regular mode key is established between the local wireless sensor 112 and the local event processing device 110, and after that, the cooperative mode key is established. Since the subsequent keys are established after the local wireless sensor 112 is physically deployed, even if later on there is any change to the wireless sensor network, the local wireless sensor 112 can instantly update the keys to reflect the currently detected network environment without any user interference.

After the regular mode key and the cooperative mode key are established, the dual-mode wireless sensor network system in the first embodiment of the present invention can executes an event processing method provided by the present invention to transmit abnormal event messages.

Figure 8:
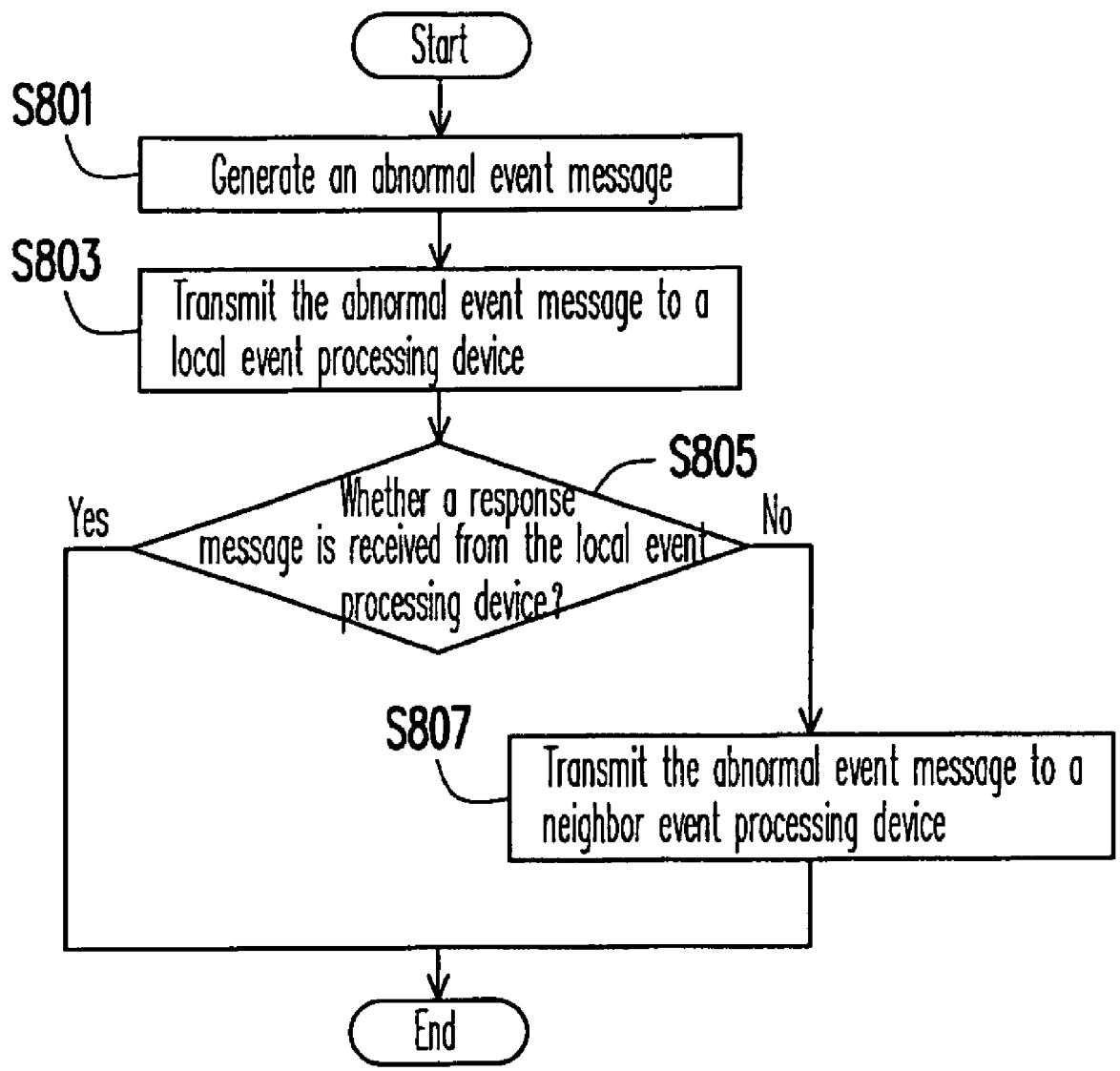
FIG. 8 is a flowchart of an event processing method for a dual-mode wireless sensor network system according to the first embodiment of the present invention.

FIG. 8 is a flowchart of an event processing method for a dual-mode wireless sensor network system according to the first embodiment of the present invention.

Referring to FIG. 8, when the local wireless sensor 112 detects an abnormal state (i.e. a fire event), it generates an abnormal event message in step S801. After that, in step S803, the local wireless sensor 112 transmits the abnormal event message to the local event processing device 110. To be specific, the local wireless sensor 112 encrypts the abnormal event message with the regular mode key in its key table and transmits the encrypted abnormal event message to the local event processing device 110, wherein the abnormal event message contains a response request message for requesting the receiver to send the received message back.

In the present embodiment, the abnormal event message transmitted by the local wireless sensor contains a sender ID, a receiver ID, and an event message encrypted with a check code. Similarly, the response message contains a sender ID, a receiver ID, and an event message encrypted with an incremental check code. However, the data contained in the abnormal event message or the response message is not limited thereto, and variable changes can be made by those skilled in the art.

In step S805, the local wireless sensor 112 determines whether a response message is received from the local event processing device 110. If it is determined in step S805 that local wireless sensor 112 receives the response message, the process is ended. If it is determined in step S805 that the local wireless sensor 112 does not receive the response message (for example, the local event processing device is broken), the local wireless sensor 112 transmits the abnormal event message to the neighbor event processing device 120 in step S807. To be specific, the local wireless sensor 112 encrypts the abnormal event message with the cooperative mode key in its key table and transmits the encrypted abnormal event message to the neighbor event processing device 120.

In overview, in the present embodiment, the local wireless sensor 112 uses a regular mode key having "0" in the mode field of the key table for encrypting and transmitting an abnormal event message. If the transmission fails, the local wireless sensor 112 then uses a cooperative mode key having "1" in the mode field of the key table for encrypting and transmitting the abnormal event message.

It has to be understood that the local wireless sensor 112 can directly or indirectly transmit the abnormal event message to the neighbor event processing device 120, wherein the indirect transmission refers to that when the neighbor event processing device 120 has neighbor wireless sensors (for example, the neighbor wireless sensor 122 in FIG. 4) or other transmitters, the local wireless sensor 112 transmits the abnormal event message to the neighbor event processing device 120 through the neighbor wireless sensors or other transmitters of the neighbor event processing device 120.

Second Embodiment

In the first embodiment, only one neighbor event processing device 120 is used for describing the present invention. However, according to the present invention, the local wireless sensor 112 may also communicate with multiple neighbor event processing devices 120.

Figure 9:
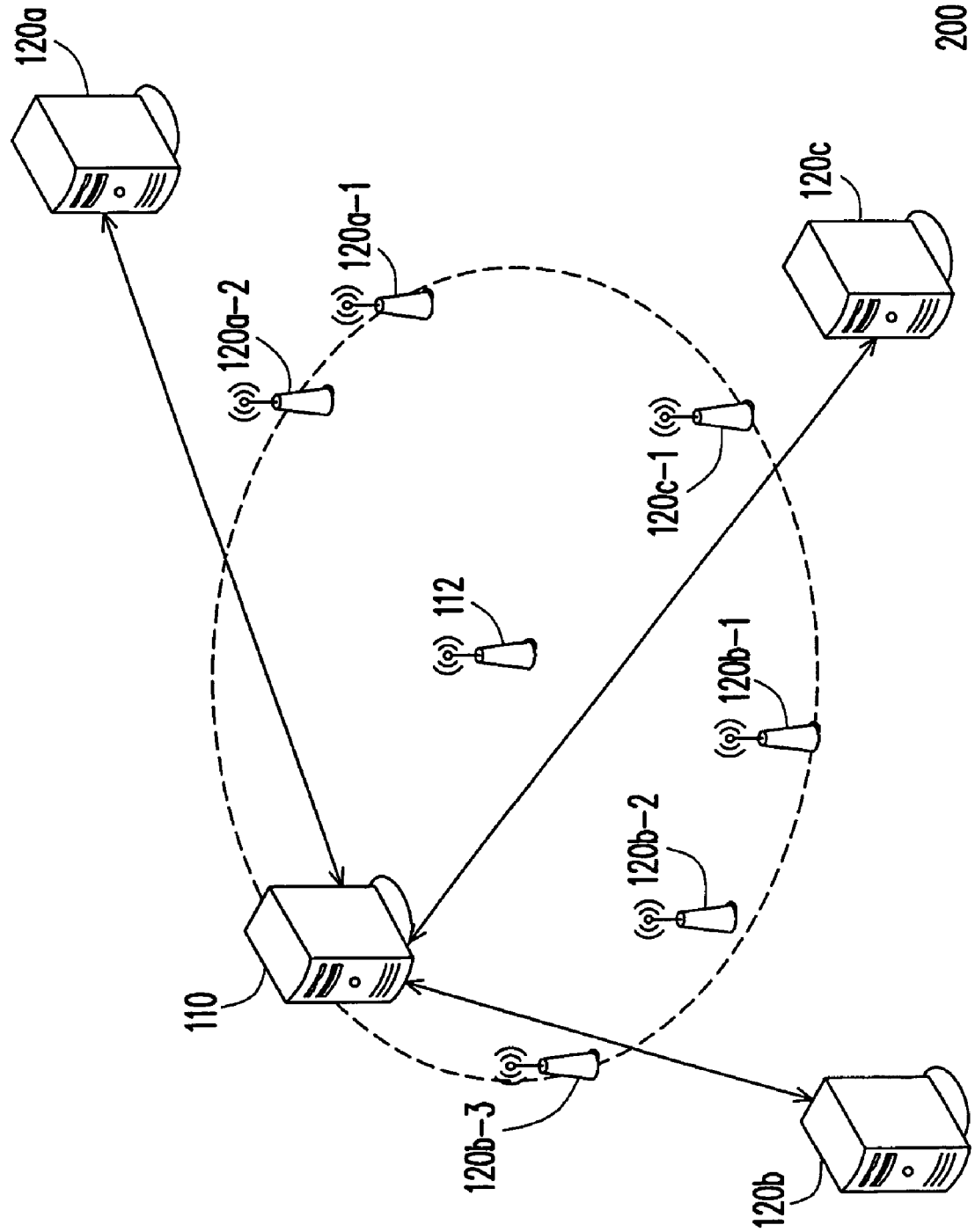
FIG. 9 is a block diagram of a dual-mode wireless sensor network system according to a second embodiment of the present invention.

FIG. 9 is a block diagram of a dual-mode wireless sensor network system according to the second embodiment of the present invention.

Referring to FIG. 9, the elements in the dual-mode wireless sensor network system 200 are basically the same as those in the dual-mode wireless sensor network system 100 illustrated in FIG. 1, and the only difference is that the dual-mode wireless sensor network system 200 includes three neighbor event processing devices 120a, 120b, and 120c connected to the local event processing device 110 through a wired network. The neighbor event processing device 120a includes two neighbor wireless sensors 120a-1 and 120a-2, the neighbor event processing device 120b includes three neighbor wireless sensors 120b-1, 120b-2, and 120b-3, and the neighbor event processing device 120c includes one neighbor wireless sensor 120c-1, wherein all the neighbor wireless sensors are located within the communicable range of the local wireless sensor 112 so that the local wireless sensor 112 can indirectly communicate with the neighbor event processing devices 120a, 120b, and 120c.

As described above, the elements in the dual-mode wireless sensor network system 200 are basically the same as those in the dual-mode wireless sensor network system 100 illustrated in FIG. 1. Accordingly, the dual-mode wireless sensor network system 200 can also execute the dual-mode key establishing process and the event processing process in the first embodiment of the present invention (as shown in FIGS. 2, 5, 7, and 8), and the data structures of the key tables are also the same as those in the first embodiment (as shown in FIGS. 3 and 6). Thus, dual-mode key establishing process and the event processing process executed and the key tables adopted by the dual-mode wireless sensor network system 200 will not be described herein.

Additionally, since the dual-mode wireless sensor network system 200 has multiple neighbor wireless sensors, the cooperative mode keys are established in the dual-mode wireless sensor network system 200 in a particular order of the neighbor event processing devices.

Figure 10:
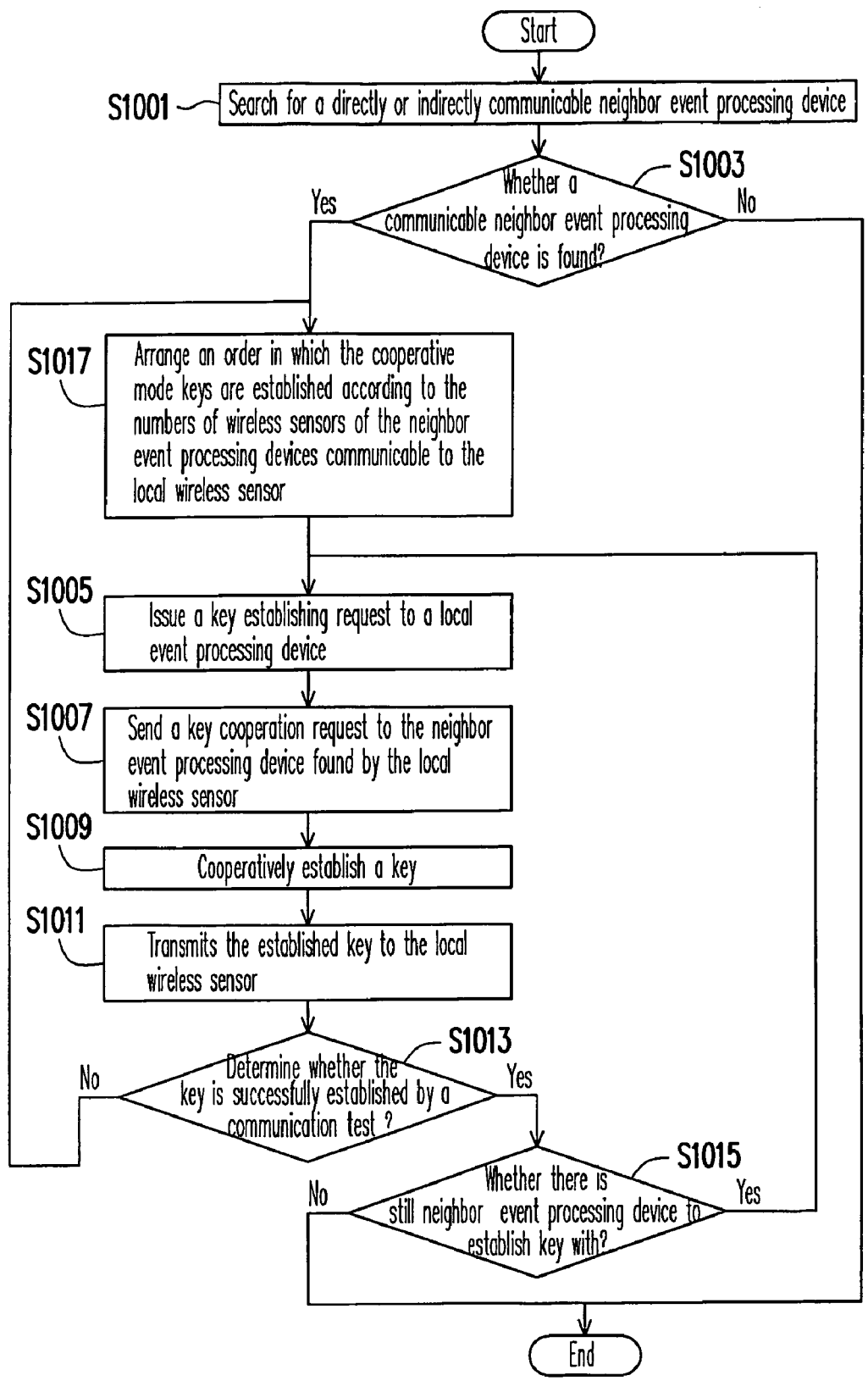
FIG. 10 is a flowchart illustrating the establishing of a special mode key according to the second embodiment of the present invention.

FIG. 10 is a flowchart illustrating the establishing of cooperative mode keys according to the second embodiment of the present invention.

Referring to FIG. 10, steps S1001~S1013 are the same as steps S501~S513 in FIG. 5 therefore will not be described herein. The difference of the process illustrated in FIG. 10 from the process illustrated in FIG. 4 is that in the process in FIG. 10, the local wireless sensor sequentially cooperates with the neighbor event processing devices to establish the cooperative mode keys according to the numbers of communicable neighbor wireless sensors between the local wireless sensor and the neighbor event processing devices, as in step S1017. In the present embodiment, since the neighbor event processing device 120a has two neighbor wireless sensors, the neighbor event processing device 120b has three neighbor wireless sensors, and the neighbor event processing device 120c has one neighbor wireless sensor, the local wireless sensor 112 establishes the cooperative mode keys in the order of the neighbor event processing device 120b, the neighbor event processing device 120a, and then the neighbor event processing device 120c. Accordingly, as shown in FIG. 10, after it is determined in step S1013 that the cooperative mode key is successfully established, whether there is still other neighbor event processing device to establish a cooperative mode key with is further determined in step S1015, and if so, step S1005 is executed.

Similarly, since the dual-mode wireless sensor network system 200 has multiple neighbor wireless sensors, the abnormal event message is transmitted in a particular order of the neighbor event processing devices when multiple event processing processes are executed.

Figure 11:
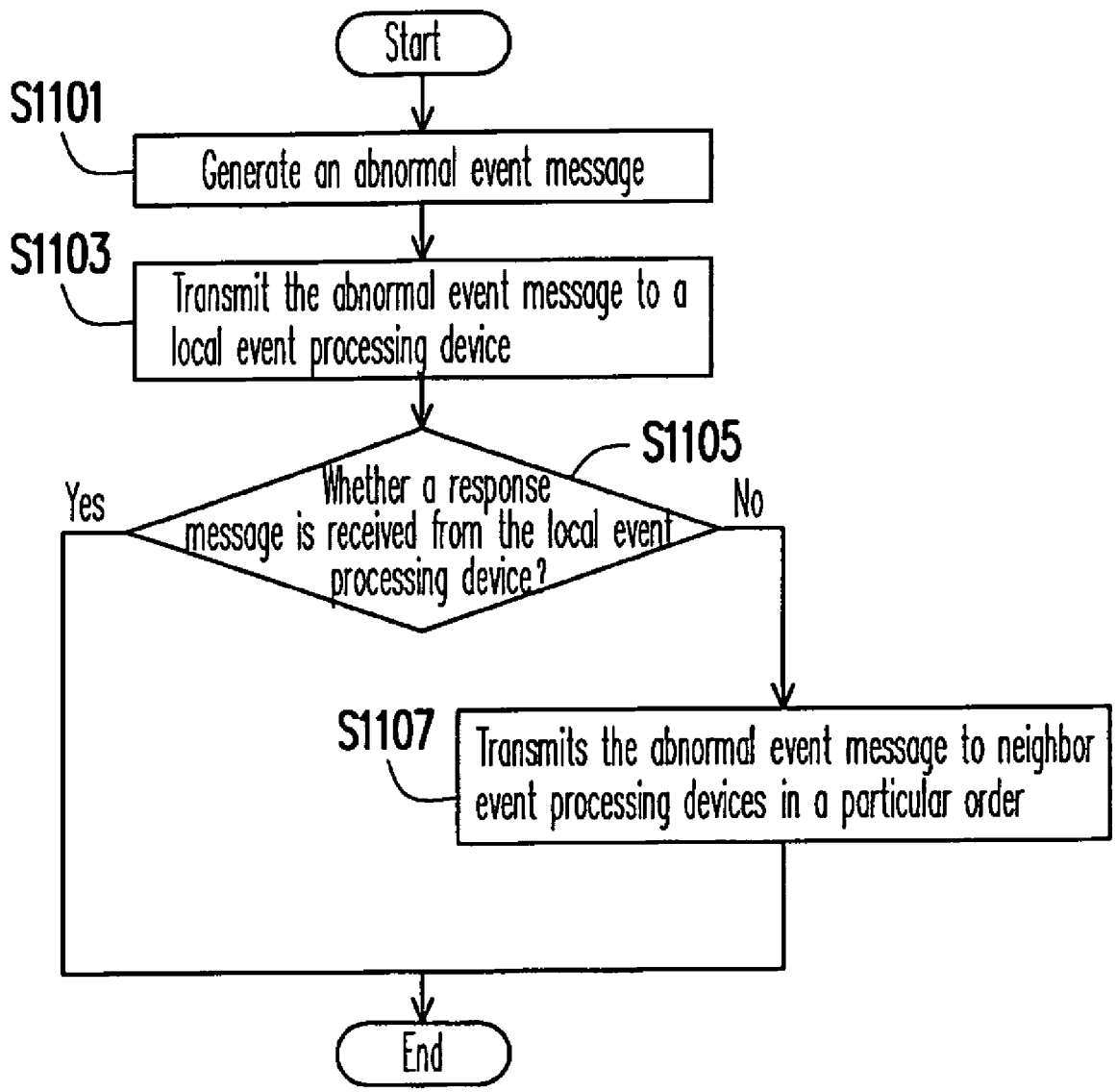
FIG. 11 is a flowchart of an event processing method for a dual-mode wireless sensor network system according to the second embodiment of the present invention.

FIG. 11 is a flowchart of an event processing method for a dual-mode wireless sensor network system according to the second embodiment of the present invention.

Referring to FIG. 11, steps S1101~S1103 are the same as steps S801~S805 in FIG. 8 therefore will not be described herein. The step S107 in FIG. 11 is similar to the step S807 in FIG. 8, and the difference between the two is that in step S1107 in FIG. 11, the abnormal event message is transmitted to the neighbor event processing devices in a specific order. To be specific, since the cooperative mode key corresponding to each neighbor event processing device is sequentially recorded in the key table (as shown in FIG. 5(a)) of the local wireless sensor when the cooperative mode keys are established, in step S1107, the abnormal event message is transmitted in the order of the cooperative mode keys recorded in the key table. In the present embodiment, the abnormal event message is sequentially transmitted to the neighbor event processing device 120b, the neighbor event processing device 120a, and the neighbor event processing device 120c.

In the present embodiment, the local wireless sensor can transmit the abnormal event message to each neighbor event processing device through any communicable wireless sensor (i.e. not only through the specific wireless sensors corresponding to the neighbor event processing device) in the wireless sensor network. Accordingly, the probability of successful transmission of abnormal event announcement is increased.

Third Embodiment

In the first embodiment, the dual-mode wireless sensor network system has one local wireless sensor, one local event processing device, and one remote event processing device. In the second embodiment, the dual-mode wireless sensor network system includes multiple neighbor event processing devices which respectively have one or multiple neighbor wireless sensors, so that the probability of successful transmission of abnormal event announcement is increased. However, to further increase the probability of successful transmission of abnormal event announcement, the dual-mode wireless sensor network system in the present invention may further include a central event processing device, wherein the central event processing device is a kind of remote event processing device as described above and a reliable event control center.

Figure 12:
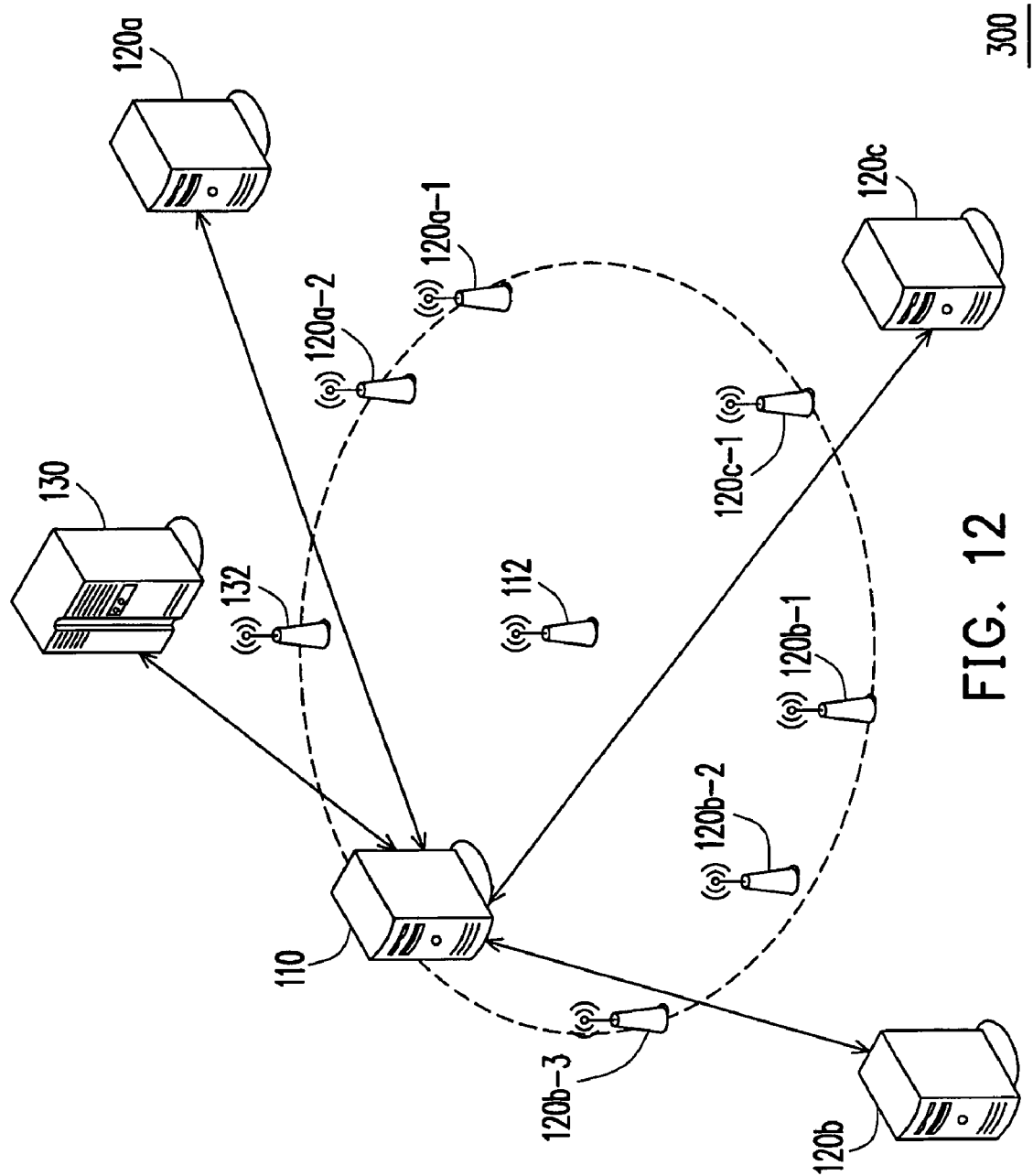
FIG. 12 is a block diagram of a dual-mode wireless sensor network system according to a third embodiment of the present invention.

FIG. 12 is a block diagram of a dual-mode wireless sensor network system according to the third embodiment of the present invention.

Referring to FIG. 12, the dual-mode wireless sensor network system 300 includes a local event processing device 110, a local wireless sensor 112, and three neighbor event processing devices 120a, 120b, and 120c connected to the local event processing device 110 through a wired network. The neighbor event processing device 120a includes two neighbor wireless sensors 120a-1 and 120a-2, the neighbor event processing device 120b includes three neighbor wireless sensors 120b-1, 120b-2, and 120b-3, and the neighbor event processing device 120c includes one neighbor wireless sensor 120c-1, wherein all the neighbor wireless sensors are within a communicable range of the local wireless sensor 112 so that the local wireless sensor 112 can communicate with the neighbor event processing devices 120a, 120b, and 120c indirectly. In the present embodiment, the structures of the local event processing device, the local wireless sensor, the neighbor event processing devices, and the neighbor wireless sensors and the key establishing method executed by the dual-mode wireless sensor network system 300 are the same as those in the first and the second embodiment described above therefore will not be described herein.

The dual-mode wireless sensor network system 300 further includes a central event processing device 130 which may be deployed in a gatehouse of a community. In the embodiment of the present invention, the central event processing device 130 geologically is farther from the local event processing device 110 than the neighbor event processing devices 120a, 120b, and 120c. It should be understood that the present invention is not limited to, the central event processing device 130 also geologically is nearer from the local event processing device 110 than the neighbor event processing devices 120a, 120b, and 120c.

The central event processing device 130 is connected to the local event processing device 110 through a wired network, and similar to the local event processing device 110, the central event processing device 130 also receives the abnormal event message from the local wireless sensor 112. In another exemplary embodiment of the present invention, the local event processing device 110 may also be connected to the central event processing device 130 through a wireless network. It should be understood that the present invention is not limited to only one central event processing device 130, namely, the dual-mode wireless sensor network system may also include multiple central event processing devices 130.

Similarly, to ensure the communication security of the wireless sensor network, the local wireless sensor 112 cooperates with the central event processing device 130 to establish a centralized mode key, wherein the centralized mode key is also the special mode key as described above. To be specific, after the local wireless sensor 112 is physical deployed, it issues a centralized mode key establishing cooperation request to the central event processing device 130 through the local event processing device 110. After the centralized mode key is cooperatively established, the local event processing device 110 sends the centralized mode key to the local wireless sensor 112.

After that, data transmitted between the local wireless sensor 112 and the central event processing device 130 is encrypted by using the centralized mode key. In the present embodiment, the mode in which the local wireless sensor 112 and the central event processing device 130 communicate with each other by using the centralized mode key is referred as a centralized mode. In the present embodiment, both the cooperative mode in which the local wireless sensor 112 transmits messages to the neighbor event processing device and the centralized mode in which the local wireless sensor 112 transmits messages to the central event processing device 130 are referred as the emergent mode describe above.

In another exemplary embodiment of the present invention, the central event processing device 130 may further include one or multiple remote wireless sensors 132. Thus, the local wireless sensor 112 can transmit messages to the central event processing device 130 through the remote wireless sensors 132. To be specific, since wireless sensors can relay messages, in the present embodiment, the local wireless sensor 112 may transmit messages to the central event processing device 130 through neighbor wireless sensors (for example, the sensor 120a-1) and/or the remote wireless sensors 132.

Figure 13:
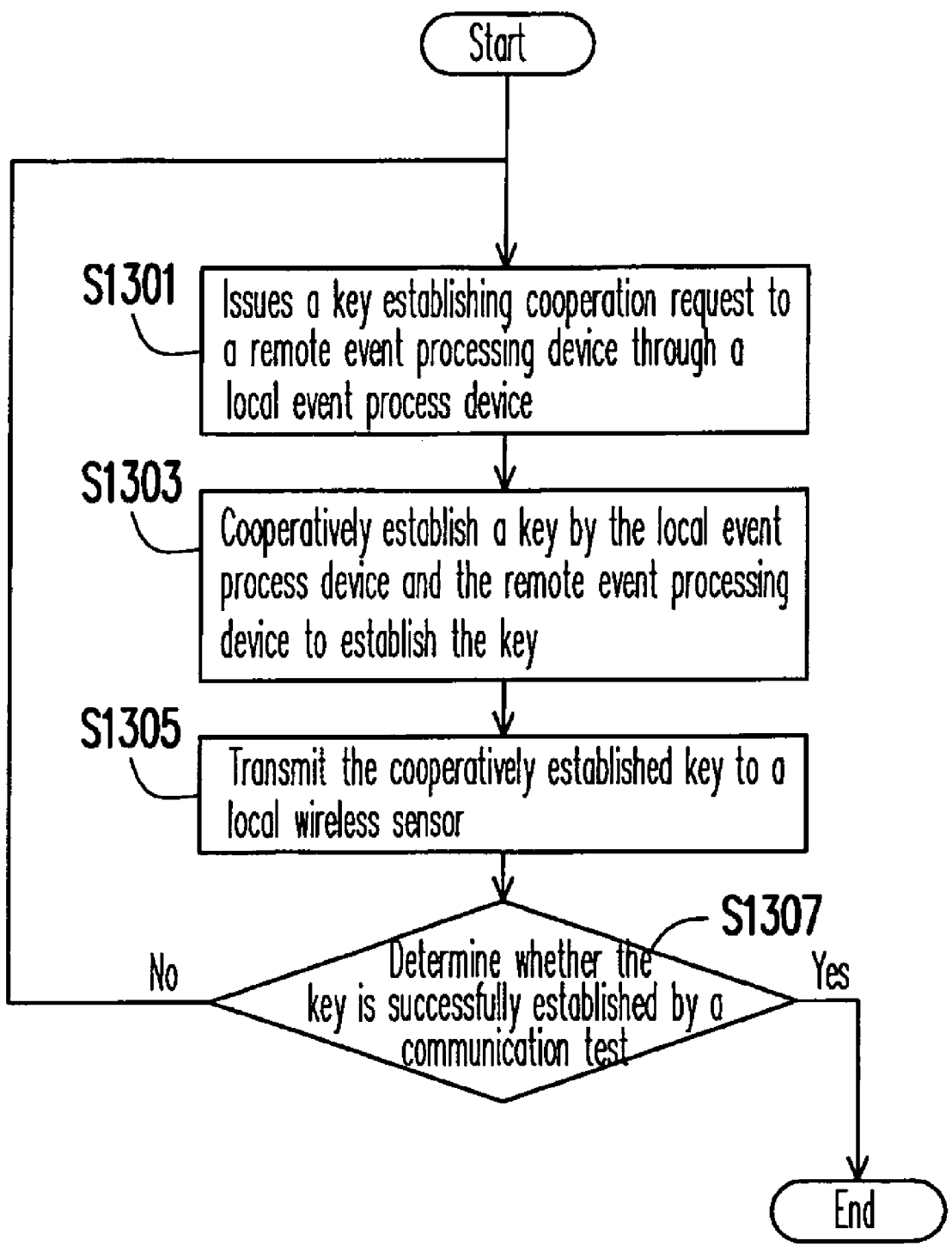
FIG. 13 is a flowchart illustrating the establishing of a centralized mode key according to the third embodiment of the present invention.

FIG. 13 is a flowchart illustrating the establishing of a centralized mode key according to the third embodiment of the present invention.

Referring to FIG. 13, in step S1301, the local event processing device 110 issues a centralized mode key establishing cooperation request to the central event processing device 130.

In step S1303, the local event processing device 110 cooperates with the central event processing device 130 to establish a centralized mode key. After that, in step S1305, the local event processing device 110 transmits the centralized mode key to the local wireless sensor 112. To be specific, in steps S1303 and S1305, a key is cooperatively established and related key information is respectively recorded in the local wireless sensor 112 and the central event processing device 130.

FIG. 14 illustrates the key tables of the local wireless sensor 112 and the central event processing device 130 when the centralized mode key is established according to the third embodiment of the present invention.

Referring to FIG. 14, FIG. 14(a) illustrates a key table 302 of the local wireless sensor 112, and the centralized mode key is recorded into the key table 302 after the regular mode key and the cooperative mode key are established, wherein "2" is recorded into the mode field to indicate that this is a centralized mode key, and the recording of the other fields is similar to that illustrated in FIG. 3(a) therefore will not be described herein.

FIG. 14(b) illustrates a key table 308 of the central event processing device 130, and the key table 308 also includes a mode field, a sensor ID field, key field, and a generation time field. The recording of the key table 308 is the sane as that of the key table of the local event processing device 110 therefore will not be described herein.

As shown in FIG. 14(a) and FIG. 14(b), when the centralized mode key is established, the related key information is respectively recorded into the two key tables 302 and 308.

Referring to FIG. 13 again, in step S1307, a communication test is carried out and whether the key is successfully established is determined. To be specific, in step S1307, the local wireless sensor 112 transmits a testing communication packet encrypted with the centralized mode key to the central event processing device 130, and it is determined that the key is successfully established if the central event processing device 130 confirms that the decrypted message is meaningful; otherwise it is determined that the key is not successfully established. If it is determined in step S1307 that the key is successfully established, the centralized mode key establishing process is ended. If it is determined in step S1307 that the key is not successfully established, the process returns to step S1301.

In the present embodiment, the centralized mode key is established by using the ISO/IEC 11770-3 key agreement protocol. However, the present invention is not limited thereto, and in another exemplary embodiment of the present invention, the centralized mode key may also be established by using any other suitable key agreement protocols.

Since in the present embodiment, the dual-mode wireless sensor network system 300 further includes the central event processing device 130, the key establishing process of the dual-mode wireless sensor network system 300 may further include cooperating with the central event processing device 130 to establish the key.

Figure 15:
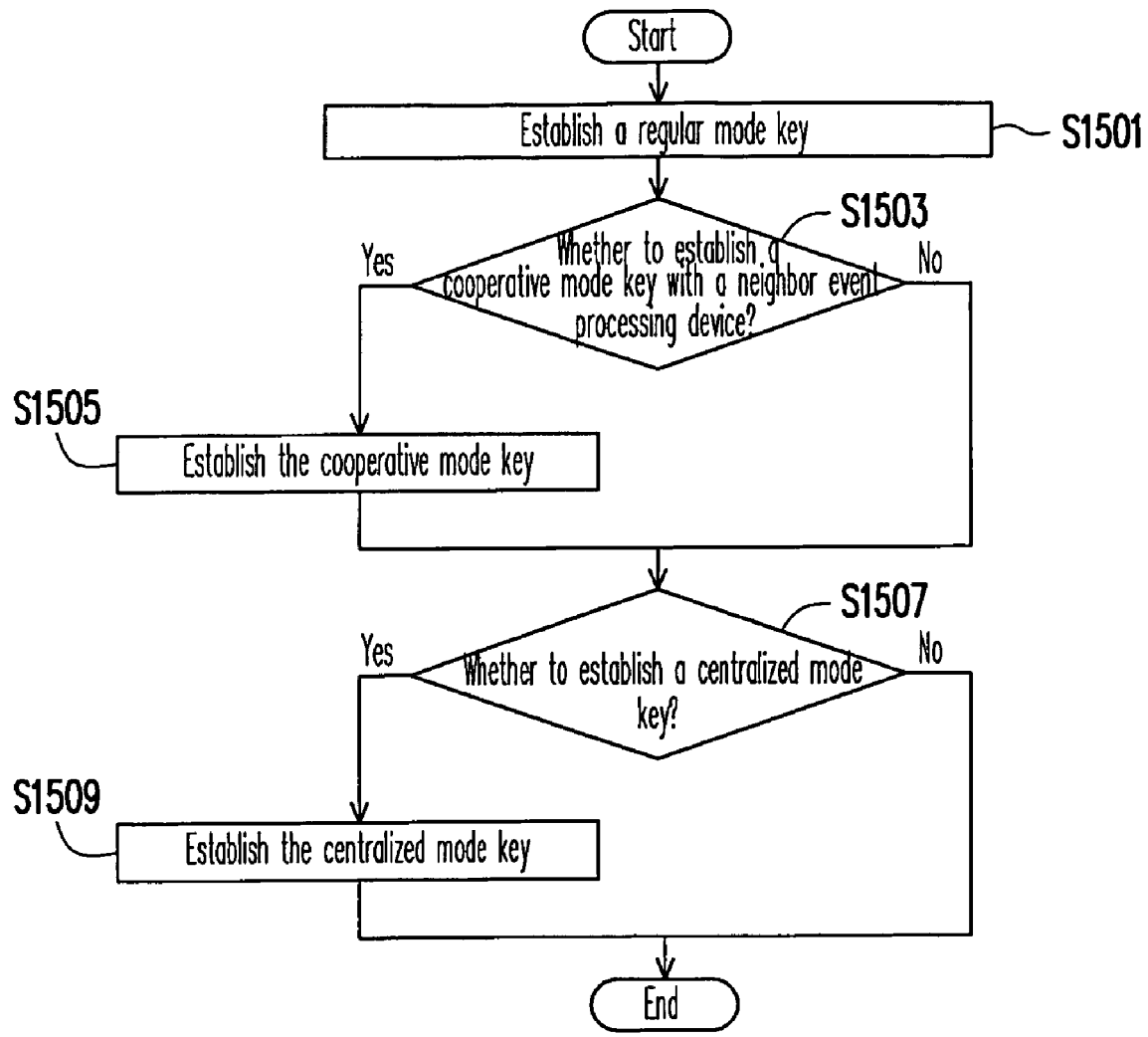
FIG. 15 is a flowchart of a key establishing method for a dual-mode wireless sensor network system according to the third embodiment of the present invention.

FIG. 15 is a flowchart of a key establishing method for a dual-mode wireless sensor network system according to the third embodiment of the present invention.

Referring to FIG. 15, steps S1501~S1505 are the same as steps S701~S705 in FIG. 7 therefore will not be described herein. The process in FIG. 15 further includes determining whether to establish a centralized mode key, as in step S1507. If it is determined in step S1507 that the centralized mode key is to be established, the centralized mode key is established in step S1509 through a process as illustrated in FIG. 14.

Similarly, since in the present embodiment, the dual-mode wireless sensor network system 300 further includes the central event processing device 130, the event processing method executed by the local wireless sensor 112 further includes transmitting the abnormal event message to the central event processing device 130.

Figure 16:
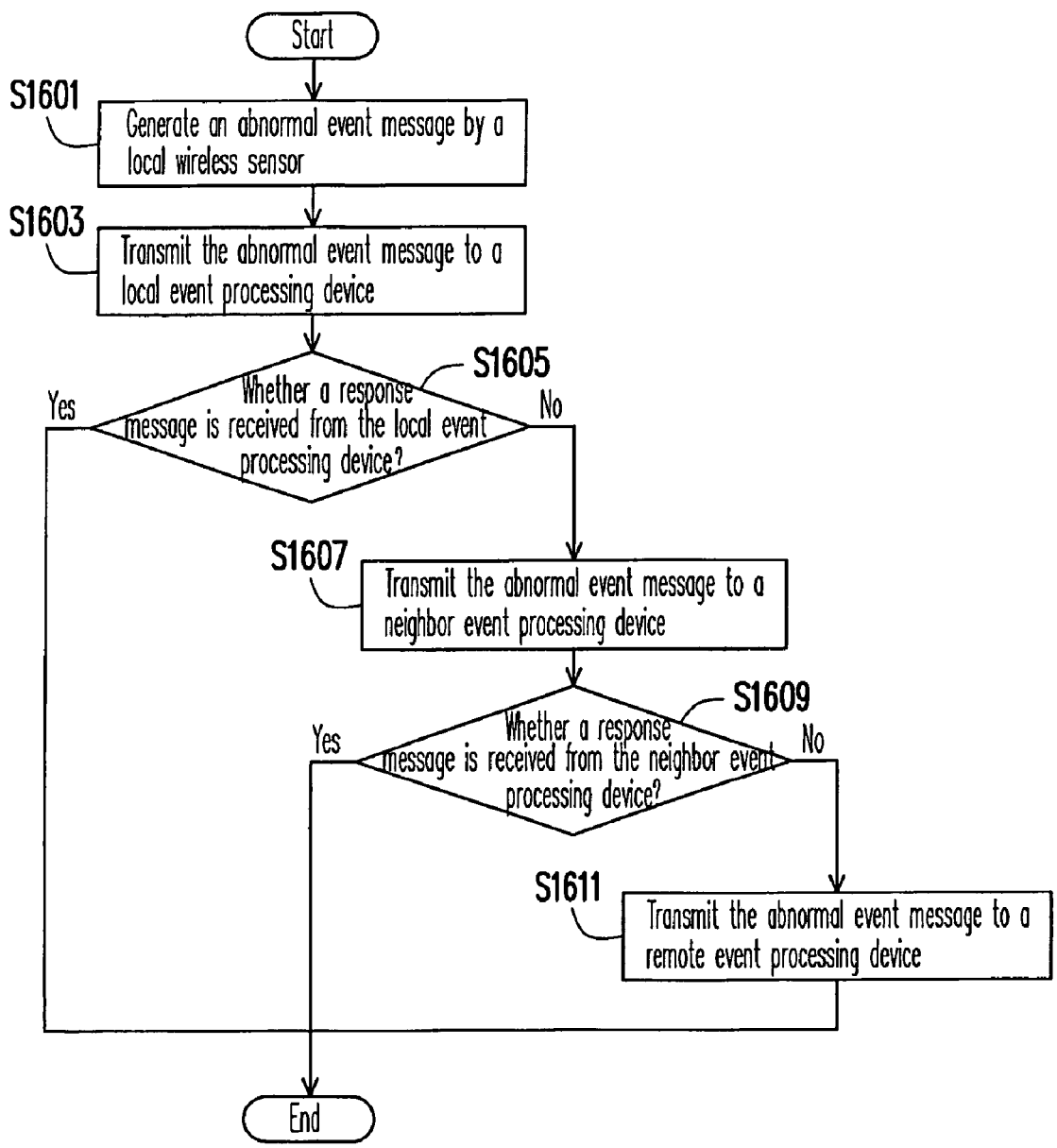
FIG. 16 is a flowchart of an event processing method for a dual-mode wireless sensor network system according to the third embodiment of the present invention.

FIG. 16 is a flowchart of an event processing method for a dual-mode wireless sensor network system according to the third embodiment of the present invention.

Referring to FIG. 16, steps S1601-S1607 are the same as steps S801~S807 in FIG. 8 therefore will not be described herein. The process in FIG. 16 further includes determining whether a response message is received from the neighbor event processing device 120, as in step S1609. If it is determined in step S1609 that the response message is received, the process is ended. If it is determined in step S1609 that the response message is not received (for example, the neighbor event processing device is also broken), then in step S1611, the local wireless sensor 112 transmits the abnormal event message to the central event processing device 130. To be specific, the local wireless sensor 112 encrypts the abnormal event message with the centralized mode key in the key table and transmits the encrypted abnormal event message to the central event processing device 130.

As described above, in the present embodiment, the local wireless sensor 112 first uses a key having "0" in the mode field of the key table for encrypting and transmitting an abnormal event message and then uses a key having "1" in the mode field of the key table for encrypting and transmitting the abnormal event message. Finally, the local wireless sensor 112 uses a key having "2" in the mode field of the key table for encrypting and transmitting the abnormal event message. When there are more than one key having mode "1" or mode "2" in the key table, the keys are read in the order in which they are recorded in the key table.

It has to be understood that the local wireless sensor 112 can transmit the abnormal event message to the central event processing device 130 directly or indirectly, wherein the indirect transmission refers to that when the neighbor event processing device 120 has neighbor wireless sensors (for example, the wireless sensors 120a-1) or other transmitters and/or the central event processing device 130 has the remote wireless sensors 132 or other transmitters, the local wireless sensor 112 transmits the abnormal event message to the central event processing device 130 through the neighbor wireless sensors, the remote wireless sensors, and/or other transmitters of the neighbor event processing device 120 and/or the central event processing device 130.

It should be mentioned that in the present embodiment, the dual-mode wireless sensor network system 300 includes the neighbor event processing device and the central event processing device. However, in another exemplary embodiment of the present invention, the dual-mode wireless sensor network system may also include only the central event processing device. In this case, any operation related to the neighbor event processing device is skipped.

Additionally, the local event processing device, the neighbor event processing device, and the central event processing device described in the first, the second, and the third embodiment of the present invention may be composed of a single computer or server or a group of computers or servers.

In overview, the dual-mode wireless sensor network system in the present invention can transmit an abnormal event message in a regular mode or an emergent mode, so that the probability of successful transmission of abnormal event announcements is effectively increased. Moreover, through the establishing of dual-mode keys, a user can securely install a wireless sensor purchased from a store to his/her own host (a local event processing device), and the wireless sensor network formed by the local host and the wireless sensor can securely transmit event data to each other (in the regular mode). Meanwhile, when the wireless sensor detects an abnormal state and an unexpected disaster (for example, system failure, unconnected to the network, and power failure etc) takes place to the corresponding local host so that the local host cannot send an announcement, the wireless sensor can form a cooperative network with neighbor wireless sensor nodes so as to transmit an emergent event announcement to a neighbor event processing device or a central event processing device (in the emergent mode) securely. As described above, the abnormal event message can be sent out level by level and so that the abnormal event can be processed appropriately. Furthermore, the key cooperation between the local wireless sensor and the neighbor event processing device or the central event processing device is carried out by the local host in a wireless pattern after the local wireless sensor network is physically set up. Thus, when a new neighbor event processing device or central event processing device is brought in, the wireless sensor can directly update the keys without being re-deployed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dual-mode wireless sensor network system, comprising:
  at least one local wireless sensor, for detecting an abnormal state of an environmental event and transmitting an abnormal event message;
  a local event processing device, for receiving the abnormal event message from the local wireless sensor, wherein the local wireless sensor cooperates with the local event processing device to establish a regular mode key; and at least one remote event processing device, for receiving the abnormal event message from the local wireless sensor, wherein the local wireless sensor cooperates with the remote event processing device to establish a special mode key, wherein the local wireless sensor encrypts the abnormal event message related to the abnormal state with the regular mode key and transmits the encrypted abnormal event message to the local event processing device when the local wireless sensor detects the abnormal state, and the local wireless sensor encrypts the abnormal event message related to the abnormal state with the special mode key and transmits the encrypted abnormal event message to the remote event processing device when the local wireless sensor does not receive a response message from the local event processing device, wherein the remote event processing device comprises a plurality of neighbor event processing devices and the special mode key comprises a cooperative mode key, the local wireless sensor initiates the establishing of the cooperative mode key with the neighbor event processing devices by issuing a key establishing request to the communicable neighbor event processing devices via the local event processing device, sequentially cooperates with the neighbor event processing devices to establish the cooperative mode key according to the numbers of communicable neighbor wireless sensors between the local wireless sensor and the neighbor event processing devices; and when the local wireless sensor does not receive a response message from the local event processing device, the local wireless sensor encrypts the abnormal event message related to the abnormal state with the cooperative mode key and transmits the encrypted abnormal event message to the neighbor event processing devices based on an order of establishing the cooperative keys between the local wireless sensor and the neighbor event processing devices.

2. The dual-mode wireless sensor network system according to claim 1, wherein when the at least one local wireless sensor comprises a plurality of local wireless sensors, the local wireless sensors transmit the abnormal event message to the local event processing device through the other local wireless sensors.

3. The dual-mode wireless sensor network system according to claim 1, wherein the remote event processing device comprises at least one remote wireless sensor, and the local wireless sensor transmits the abnormal event message to the remote event processing device through the remote wireless sensor.

4. The dual-mode wireless sensor network system according to claim 1, wherein the remote event processing device further comprises at least one central event processing device, and the special mode key further comprises a centralized mode key, wherein the local wireless sensor cooperates with the central event processing device to establish the centralized mode key.

5. The dual-mode wireless sensor network system according to claim 4, wherein the local wireless sensor cooperates with the neighbor event processing devices to establish the cooperative mode key and cooperates with the central event processing device to establish the centralized mode key through the local event processing device.

6. The dual-mode wireless sensor network system according to claim 4, wherein when the local wireless sensor does not receive a response message from the neighbor event processing devices, the local wireless sensor encrypts the abnormal event message related to the abnormal state with the centralized mode key and transmits the encrypted abnormal event message to the central event processing device.

7. The dual-mode wireless sensor network system according to claim 6, wherein the neighbor event processing devices and the central event processing device respectively comprise at least one neighbor wireless sensor and at least one central wireless sensor, and the local wireless sensor transmits the abnormal event message to the neighbor event processing devices or the central event processing device through at least one of the neighbor wireless sensor and the central wireless sensor.

8. The dual-mode wireless sensor network system according to claim 1, wherein the environmental event comprises at least one of temperature, humidity, gas, and pressure.

9. An event processing method for a dual-mode wireless sensor network system, wherein the dual-mode wireless sensor network system comprises at least one local wireless sensor, a local event processing device, and at least one remote event processing device, the event processing method for the dual-mode wireless sensor network system comprising:

detecting an abnormal state of an environmental event;

in response to the detecting, encrypting an abnormal event message related to the abnormal state with a regular mode key and transmitting the encrypted abnormal event message to the local event processing device; and encrypting the abnormal event message related to the abnormal state with a special mode key and transmitting the encrypted abnormal event message to the remote event processing device when the local wireless sensor does not receive a response message from the local event processing device, wherein the remote event processing device comprises a plurality of neighbor event processing devices and the step of encrypting the abnormal event message related to the abnormal state with the special mode key and transmitting the encrypted abnormal event message to the remote event processing device comprises:

encrypting the abnormal event message related to the abnormal state with a cooperative mode key and transmitting the encrypted abnormal event message to the neighbor event processing devices based on an order of establishing the cooperative mode key between the local wireless sensor and the neighbor event processing devices, wherein the establishing of the cooperative mode key is initiated by the local wireless sensor issuing a key establishing request to the communicable neighbor event processing devices via the local event processing device, and the order of establishing the cooperative mode key between the local wireless sensor and the neighbor event processing devices is generated by the local wireless sensor sequentially cooperating with the neighbor event processing devices according to the numbers of communicable neighbor wireless sensors between the local wireless sensor and the neighbor event processing devices.

10. The event processing method according to claim 9, wherein the remote event processing device further comprises at least one central event processing device, wherein the step of cooperatively establishing the special mode key between the local wireless sensor and the remote event processing device through the local event processing device further comprises establishing a centralized mode key between the local wireless sensor and the central event processing device through the local event processing device.

11. The event processing method according to claim 10, wherein the cooperative mode key and the centralized mode key are established by using an ISO/IEC 11770-3 key agreement protocol.

12. The event processing method according to claim 9, wherein when the at least one local wireless sensor comprises a plurality of local wireless sensors, the event processing method further comprises transmitting the abnormal event message to the local event processing device through the other local wireless sensors.

13. The event processing method according to claim 9, wherein when the remote event processing device comprises at least one remote wireless sensor, the step of transmitting the abnormal event message to the remote event processing device further comprises transmitting the abnormal event message to the remote event processing device through the remote wireless sensor.

14. The event processing method according to claim 13, wherein the remote event processing device further comprises at least one central event processing device and the step of encrypting the abnormal event message related to the abnormal state with the special mode key and transmitting the encrypted abnormal event message to the remote event processing device further comprises:

encrypting the abnormal event message related to the abnormal state with a centralized mode key and transmitting the encrypted abnormal event message to the central event processing device when the local wireless sensor does not receive a response message from the neighbor event processing devices.

* * * * *